United States Patent
Cheng et al.

(10) Patent No.: US 8,218,654 B2
(45) Date of Patent: Jul. 10, 2012

(54) METHOD FOR REDUCING CHANNEL CHANGE STARTUP DELAYS FOR MULTICAST DIGITAL VIDEO STREAMS

(75) Inventors: Gary Fujen Cheng, Sunnyvale, CA (US); Charles Shen, Fremont, CA (US); Jack C. Cham, San Leandro, CA (US); Ping Li, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1507 days.

(21) Appl. No.: 11/371,987

(22) Filed: Mar. 8, 2006

(65) Prior Publication Data
US 2007/0214490 A1    Sep. 13, 2007

(51) Int. Cl.
*H04N 7/12* (2006.01)
(52) U.S. Cl. ......... 375/240.28; 375/240.12; 375/240.13; 375/240.23; 375/240.24; 375/240.27; 725/110; 725/135
(58) Field of Classification Search ............. 375/240.12, 375/240.24, 240.26–240.28, 240.16, 240.01, 375/240.13, 240.22
See application file for complete search history.

(56) References Cited

U.S. PATENT DOCUMENTS

| | | | |
|---|---|---|---|
| 3,840,862 A | 10/1974 | Ready | |
| 4,291,196 A | 9/1981 | Spaniol et al. | |
| 4,426,682 A | 1/1984 | Riffe et al. | |
| 4,802,085 A | 1/1989 | Levy et al. | |
| 4,811,203 A | 3/1989 | Hamstra | |
| 5,155,824 A | 10/1992 | Edenfield et al. | |
| 5,307,477 A | 4/1994 | Taylor | |
| 5,483,587 A | 1/1996 | Hogan et al. | |
| 5,524,235 A | 6/1996 | Larson et al. | |
| 5,551,001 A | 8/1996 | Cohen et al. | |
| 5,600,366 A | 2/1997 | Schulman | |
| 5,636,354 A | 6/1997 | Lear | |
| 5,673,253 A | 9/1997 | Shaffer | |
| 5,729,687 A | 3/1998 | Rothrock et al. | |
| 5,734,861 A | 3/1998 | Cohn et al. | |
| 5,828,844 A | 10/1998 | Civanlar | |
| 5,870,763 A | 2/1999 | Lomet | |
| 5,926,227 A | 7/1999 | Schoner et al. | |
| 5,933,195 A | 8/1999 | Florencio | |
| 5,933,593 A | 8/1999 | Arun et al. | |

(Continued)

FOREIGN PATENT DOCUMENTS

EP    1271953    1/2003

(Continued)

OTHER PUBLICATIONS www.networkworld.com, Jim Duffy, "Riverstone recasts multicast video," 2 pages total, Aug. 5, 2002, Network World, Inc., www.networkworld.com/edge/news/2002/0805edge.html.

(Continued)

*Primary Examiner* — Hirdepal Singh
(74) *Attorney, Agent, or Firm* — Stolowitz Ford Cowger LLP

(57) ABSTRACT

Methods and systems for reducing channel change startup delays for multicast digital video streams are described. Packets of a multicast digital video transport stream having a plurality of normal Group of Pictures are received. Further, a channel change request is received and a speed-up Group of Pictures is inserted in the stream in response to the channel change request. In one embodiment, video stream specific information is also inserted in the stream. The packets are processed and transmitted.

15 Claims, 5 Drawing Sheets

U.S. PATENT DOCUMENTS

| | | |
|---|---|---|
| 5,963,217 A | 10/1999 | Grayson et al. |
| 6,003,116 A | 12/1999 | Morita et al. |
| 6,034,746 A | 3/2000 | Desai et al. |
| 6,065,050 A | 5/2000 | DeMoney |
| 6,119,205 A | 9/2000 | Wicki et al. |
| 6,137,834 A | 10/2000 | Wine et al. |
| 6,141,324 A | 10/2000 | Abbott et al. |
| 6,151,636 A | 11/2000 | Schuster et al. |
| 6,236,854 B1 | 5/2001 | Bradshaw |
| 6,278,716 B1 | 8/2001 | Rubenstein |
| 6,289,054 B1 | 9/2001 | Rhee |
| 6,332,153 B1 | 12/2001 | Cohen |
| 6,501,739 B1 | 12/2002 | Cohen |
| 6,567,929 B1 | 5/2003 | Bhagavath et al. |
| 6,570,926 B1 | 5/2003 | Agrawal et al. |
| 6,608,820 B1 | 8/2003 | Bradshaw |
| 6,608,841 B1 | 8/2003 | Koodli |
| 6,624,841 B1 | 9/2003 | Buchner et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |
| 6,721,290 B1 | 4/2004 | Kondylis et al. |
| 6,735,572 B2 | 5/2004 | Landesmann |
| 6,744,785 B2 | 6/2004 | Robinett et al. |
| 6,766,418 B1 | 7/2004 | Alexander |
| 6,771,644 B1 | 8/2004 | Brassil et al. |
| 6,775,247 B1 | 8/2004 | Shaffer et al. |
| 6,782,490 B2 | 8/2004 | Maxemchuk et al. |
| 6,792,047 B1 | 9/2004 | Bixby |
| 6,804,244 B1 | 10/2004 | Anandakumar et al. |
| 6,816,469 B1 | 11/2004 | Kung et al. |
| 6,823,470 B2 | 11/2004 | Smith et al. |
| 6,865,157 B1 | 3/2005 | Scott et al. |
| 6,865,540 B1 | 3/2005 | Faber et al. |
| 6,876,734 B1 | 4/2005 | Summers et al. |
| 6,910,148 B1 | 6/2005 | Ho et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 7,114,002 B1 | 9/2006 | Okumura et al. |
| 7,127,487 B1 | 10/2006 | Wang et al. |
| 7,164,680 B2 | 1/2007 | Loguinov |
| 7,180,896 B1 | 2/2007 | Okumura et al. |
| 7,224,702 B2 | 5/2007 | Lee |
| 7,234,079 B2 | 6/2007 | Cheng et al. |
| 7,257,664 B2 | 8/2007 | Zhang |
| 7,263,075 B2 | 8/2007 | Roh et al. |
| 7,296,205 B2 | 11/2007 | Curcio et al. |
| 7,324,527 B1 | 1/2008 | Fraas et al. |
| 7,373,413 B1 | 5/2008 | Nguyen |
| 7,379,653 B2 | 5/2008 | Yap et al. |
| 7,392,424 B2 | 6/2008 | Ho et al. |
| 7,397,759 B2 | 7/2008 | Tan et al. |
| 7,532,621 B2 | 5/2009 | Birman et al. |
| 7,562,277 B2 | 7/2009 | Park et al. |
| 7,707,303 B2 | 4/2010 | Albers |
| 7,711,938 B2 * | 5/2010 | Wise et al. ................ 712/300 |
| 7,870,590 B2 | 1/2011 | Jagadeesan et al. |
| 7,965,771 B2 * | 6/2011 | Wu et al. ................ 375/240.12 |
| 2001/0000540 A1 | 4/2001 | Cooper et al. |
| 2002/0004841 A1 | 1/2002 | Sawatari |
| 2002/0010938 A1 | 1/2002 | Zhang et al. |
| 2002/0087976 A1 | 7/2002 | Kaplan et al. |
| 2002/0114332 A1 | 8/2002 | Apostolopoulos et al. |
| 2002/0126711 A1 | 9/2002 | Robinett et al. |
| 2002/0163918 A1 | 11/2002 | Cline |
| 2003/0025786 A1 | 2/2003 | Norsworthy |
| 2003/0025832 A1 | 2/2003 | Swart et al. |
| 2003/0076850 A1 | 4/2003 | Jason, Jr. |
| 2003/0101408 A1 | 5/2003 | Martinian et al. |
| 2003/0158899 A1 | 8/2003 | Hughes |
| 2003/0198195 A1 | 10/2003 | Li |
| 2003/0231863 A1 | 12/2003 | Eerenberg et al. |
| 2003/0236903 A1 | 12/2003 | Piotrowski |
| 2004/0057449 A1 | 3/2004 | Black |
| 2004/0071128 A1 | 4/2004 | Jang et al. |
| 2004/0078624 A1 | 4/2004 | Maxemchuk et al. |
| 2004/0100937 A1 | 5/2004 | Chen |
| 2004/0114576 A1 | 6/2004 | Itoh et al. |
| 2004/0143672 A1 | 7/2004 | Padmanabham et al. |
| 2004/0165527 A1 | 8/2004 | Gu et al. |
| 2004/0165710 A1 | 8/2004 | DelHoyo et al. |
| 2004/0196849 A1 | 10/2004 | Aksu et al. |
| 2004/0199659 A1 | 10/2004 | Ishikawa et al. |
| 2004/0213152 A1 | 10/2004 | Matuoka et al. |
| 2004/0244058 A1 * | 12/2004 | Carlucci et al. ................ 725/135 |
| 2004/0255328 A1 | 12/2004 | Baldwin et al. |
| 2005/0058131 A1 | 3/2005 | Samuels et al. |
| 2005/0069102 A1 | 3/2005 | Chang |
| 2005/0074007 A1 | 4/2005 | Samuels et al. |
| 2005/0078171 A1 | 4/2005 | Firestone et al. |
| 2005/0078698 A1 | 4/2005 | Araya et al. |
| 2005/0081244 A1 | 4/2005 | Barrett et al. |
| 2005/0099499 A1 | 5/2005 | Braustein |
| 2005/0138372 A1 | 6/2005 | Kajihara et al. |
| 2005/0198367 A1 | 9/2005 | Ettikan |
| 2005/0207406 A1 | 9/2005 | Reme |
| 2005/0244137 A1 | 11/2005 | Takashima et al. |
| 2005/0249231 A1 | 11/2005 | Khan |
| 2005/0259803 A1 | 11/2005 | Khartabil |
| 2005/0265346 A1 | 12/2005 | Ho et al. |
| 2005/0289623 A1 * | 12/2005 | Midani et al. ................ 725/100 |
| 2006/0020995 A1 | 1/2006 | Opie et al. |
| 2006/0048193 A1 | 3/2006 | Jacobs et al. |
| 2006/0075084 A1 | 4/2006 | Lyon |
| 2006/0075443 A1 | 4/2006 | Eckert |
| 2006/0083263 A1 | 4/2006 | Jagadeesan et al. |
| 2006/0085551 A1 | 4/2006 | Xie et al. |
| 2006/0104458 A1 | 5/2006 | Kenoyer et al. |
| 2006/0120378 A1 | 6/2006 | Usuki et al. |
| 2006/0126667 A1 | 6/2006 | Smith et al. |
| 2006/0143669 A1 | 6/2006 | Cohen |
| 2006/0159093 A1 * | 7/2006 | Joo et al. ................ 370/390 |
| 2006/0187914 A1 | 8/2006 | Gumaste et al. |
| 2006/0188025 A1 | 8/2006 | Hannuksela |
| 2006/0189337 A1 | 8/2006 | Farrill et al. |
| 2006/0242240 A1 * | 10/2006 | Parker et al. ................ 709/205 |
| 2006/0242669 A1 | 10/2006 | Wogsberg |
| 2006/0259755 A1 | 11/2006 | Kenoyer |
| 2006/0279437 A1 | 12/2006 | Luby |
| 2007/0008934 A1 | 1/2007 | Balasubramanian et al. |
| 2007/0044130 A1 * | 2/2007 | Skoog ................ 725/110 |
| 2007/0098079 A1 | 5/2007 | Boyce et al. |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |
| 2007/0200949 A1 * | 8/2007 | Walker et al. ................ 348/412.1 |
| 2007/0204320 A1 * | 8/2007 | Wu et al. ................ 725/135 |
| 2007/0268899 A1 | 11/2007 | Cankaya |
| 2007/0277219 A1 | 11/2007 | Toebes et al. |
| 2008/0062990 A1 | 3/2008 | Oran |
| 2008/0189489 A1 | 8/2008 | Mitra |
| 2008/0192839 A1 | 8/2008 | Gahm et al. |
| 2008/0225850 A1 | 9/2008 | Oran |
| 2008/0253369 A1 | 10/2008 | Oran |
| 2008/0256409 A1 | 10/2008 | Oran et al. |
| 2008/0267078 A1 | 10/2008 | Farinacci |
| 2008/0310435 A1 | 12/2008 | Cagenius et al. |
| 2009/0034627 A1 | 2/2009 | Rodriguez |
| 2009/0034633 A1 | 2/2009 | Rodirguez |
| 2009/0049361 A1 | 2/2009 | Koren et al. |
| 2009/0055540 A1 * | 2/2009 | Foti et al. ................ 709/228 |
| 2009/0119722 A1 | 5/2009 | VerSteeg |
| 2009/0150715 A1 | 6/2009 | Pickens |
| 2009/0201803 A1 | 8/2009 | Filsfils |
| 2009/0201805 A1 | 8/2009 | Begen |

| | | | |
|---|---|---|---|
| 2009/0213726 | A1 | 8/2009 | Asati |
| 2010/0005360 | A1 | 1/2010 | Begen |
| 2010/0036962 | A1 | 2/2010 | Gahm |

FOREIGN PATENT DOCUMENTS

| | | |
|---|---|---|
| EP | 1553735 | 7/2005 |
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 8731381.3 | 11/2009 |
| WO | 9718637 | 5/1997 |
| WO | 0019693 | 4/2000 |
| WO | 0035201 | 6/2000 |
| WO | 00/76113 | 12/2000 |
| WO | 0161909 | 8/2001 |
| WO | 2006031925 | 3/2006 |
| WO | 2006057606 | 6/2006 |
| WO | 2006107424 | 10/2006 |
| WO | 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009099847 | 8/2009 |

OTHER PUBLICATIONS

Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.
International Search Report for PCT/US09/032305; Date of mailing Oct. 5, 2009.
Written Opinion of the International Searching Authority for PCT/US09/032305; Date of mailing Oct. 5, 2009.
International Search Report for PCT/US08/55837; Date of mailing Jul. 3, 2008.
Written Opinion of the International Searching Authority for PCT/US08/55837; Date of mailing Jul. 3, 2008.
Written Opinion of the International Searching Authority for PCT/US08/52907; Mailing Date Jul. 7, 2008.
Written Opinion of the International Searching Authority for PCT/US07/76264; Mailing date Jul. 7, 2008.
International Search Report for PCT/US07/76265 ; Mailing date Aug. 20, 2008.
Written Opinion of the International Searching Authority for PCT-US07-76265; Aug. 20, 2008.
Degalahal, et al., Analyzing Soft Errors in Leakage Optimized SRAM Design, Article, Jan. 2003, pp. 1-7, 16th International Conference on VLSI Design.
Zhang, Computing Cache Vulnerablity to Ransietn Errors and It's Implication, Article, Oct. 2005, pp. 1-9, IEEE Computer Society.
Weaver, et al. Reducing the Soft-Error Rate of a High-Performance Microprocessor, Article, 2004, pp. 30-37, IEEE Computer Society.
Li, et al., Soft Error and Energy Consumption Interactions: A Data Cache Perspective, Article, Aug. 9, 2004, pp. 1-6, ISLPED '04.
Stolowitz Ford Cowger LLP, Listing of related cases Mar. 3, 2010.
USPTO, PCT International Search Report, Jul. 7, 2008, 3 pgs.
Lehman et al., Active Reliable Multicast (ARM), 1998, IEEE, pp. 581-589.
Liang et al., Feedback suppression in reliable multicast protocol, 2000, IEEE, pp. 1436-1439.
Adamson et al., Negative-Acknowledgment (NACK)-Oriented Reliable Multicast (NORM) Building Blocks (RFC 3941), Nov. 2004, RFC 3941 (IETF, ORG), pp. 1-37.
U.S. Appl. No. 11/736,463, filed Apr. 17, 2007—Prosecution History.
U.S. Appl. No. 11/735,930, filed Apr. 16, 2007—Prosecution History.
U.S. Appl. No. 11/561,237, filed Nov. 17, 2006—Prosecution History.
Rosenberg, J., et al., "Registration of parityfec MME types", RFC 3009, Nov. 2000, 11 pgs.
Luby, M., et al., "Forward Error Correction (FEC) Building Block", RFC 3452, Dec. 2002, 16 pages.
Schulzrinne, H., "RTP: A Transport Protocol for Real-Time Applications", RFC 3550, Jul. 2003, 89 pages.
Luby, M., et al., "Compact Forward Error Correction (FEC) Schemes", RFC 3695, Feb. 2004, 14 pages.
Ott, J., et al., "Extended RTP Profile for RTCP-based Feedback (RTP/AVPF)", draft-ietf-avt-rtcp-feedback-11, Aug. 10, 2004, 52 pages.
Watson, M., "Basic Forward Error Correction (FEC) Schemes", draft-ietf-rmt-bb-fec-basic-schemes-revised-02, Mar. 3, 2006, 17 pages.
Chesterfield, J., et al., "RTCP Extensions for Single-Source Multicast Sessions", draft-ietf-avt-rtcpssm-11, Mar. 6, 2006, 67 pages.
Rey, J., et al., "RTP Retransmission Payload Format", RFC 4588, Jul. 2006, 24 pages.
Pendleton, et al., Session Initiation Package for Voice Quality Reporting Event, Sipping Working Group, 2006, pp. 1-24.
USPTO, PCT International Search Report, Jul. 7, 2008, 3 pgs.— Different.
Supplementary European Search Report for EP08731381, Mar. 26, 2010, 7 pages.
Rey et al., "RTP Retransmission Payload Format—RFC 4588", Jul. 1, 2006, 29 pages.
Handley, M. et al., "SIP: Session Initiation Protocol", RFC 2543, Mar. 1999.
T. Friedman, "RTP Control Protocol Extended Reports (RTCP XR)", RFC 3611, Nov. 2003.
Ott, "Extended RTP Profile for RTCP-based Feedback (RTP/AVPF)" draft-ieft-av-rtcp-feedback-01-txt., Nov. 21, 2001.
Approach Inc., "Streaming Media Technical Analysis", Nov. 2000.
Turner, Jonathan S., "WDM Burst Switching" www.isoc.org/inet99/proceedings/4j/4j_3.htm, 1999.
GossamerThreads, "Channel Change Speed", www.gossamer-threads.com/lists/engine?do=post_view_flat;post=13776, Sep. 12, 2003.
Nguyen, Thinh et.al., Protocols for Distributed Video Streaming, IEEE ICIP 2002.
Byers, John W. et al., Accessing Multiple Mirror Sites in Parallel: Using Tornado Codes to Speed Up Downloads, IEEE 1999.
Cisco Systems, Cisco Visual Quality Experience: Product Overview, www.cisco.com/en/US/partner/prod/collateral/video/ps7191/ps7126/product_data_sheet0900aecd8057f446.html, 2009.
Cisco Systems, Converge IP and DWDM Layers in the Core Network, http://www.cisco.com/en/US/prod/collateral/routers/ps5763/prod_white_paper0900aecd80395e03.html, 2007.
Silver Peak Systems, Inc., "Data Center Class WAN Optimization: Latency & Loss Mitigation", www.silver-peak.com/Technology/latency_loss_mitigation.htm., 2010.
P. A. Chou and Z. Miao, "Rate-distortion optimized streaming of packetized media," Microsoft Research Technical Report MSR-TR-2001-35, Feb. 2001.
Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.
Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.
European Search Report for EP08728919; Aug. 19, 2010; 11 pgs.
Begen, Ali C., Enhancing The Multimedia Experience in Emerging Network, A Thesis Presented to The Academic Faculty; Dec. 2006; available at http://etd.gatech.edu/theses/available/etd-11062006-002415/.

* cited by examiner

METHOD FOR REDUCING CHANNEL CHANGE STARTUP DELAYS FOR MULTICAST DIGITAL VIDEO STREAMS

RELATED APPLICATIONS

The U.S. patent application Ser. No. 10/969,113, filed Oct. 20, 2004, entitled "SYSTEM AND METHOD FOR FAST START-UP OF LIVE MULTICAST STREAMS TRANSMITTED OVER A PACKET NETWORK," by Ramanathan T. Jagadeesan, Kristen Marie Robins, Bich Tu Nguyen, and Fang Wu, assigned to the same assignee of the present Patent Application, is hereby incorporated by reference.

TECHNICAL FIELD

Embodiments of the present invention pertain to digital video transport streams, and in particular to a method of reducing the startup delay for multicast digital video transport streams.

BACKGROUND

As video transmission systems have matured, digital video is more readily available via a variety of different communications systems and networks. Specifically, digital video, such as television programs, can be transmitted as multicast digital bit streams of video signals to users over networks. Changing between channels of the multicast digital bit streams can often result in significant delays and interruption in user presentation experience.

Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box.

However, unfortunately, live multicast video streams transmitted over a network, e.g., an IP distribution network, are frequently affected by start-up delays when a user changes channel. Start-up delays can be caused by video stream characteristics, buffer fill-up time, and/or the time it takes to acquire video stream specific information. Video stream specific information is a periodic update and interleaves with other data. For example, conventional channel change operations wait to acquire video stream specific information and the beginning of the next GOP before presenting content, which often results in relatively long delays.

In particular, a single factor that can cause a considerable set-top box startup delay is the length of the Group of Picture involved. Traditionally the set-top box startup time is directly related to the lengths of a Group of Picture (GOP) from the new channel. Thus, typically the longer the GOP length, the longer the startup delay time is for a set-top box. As a result, in general, the start-up delay associated with GOP length prevents a user from being able to transition from one channel to another without appreciable delay. Consequently, the multimedia experience is affected and made less enjoyable.

BRIEF DESCRIPTION

DETAILED DESCRIPTION

Figure 1:
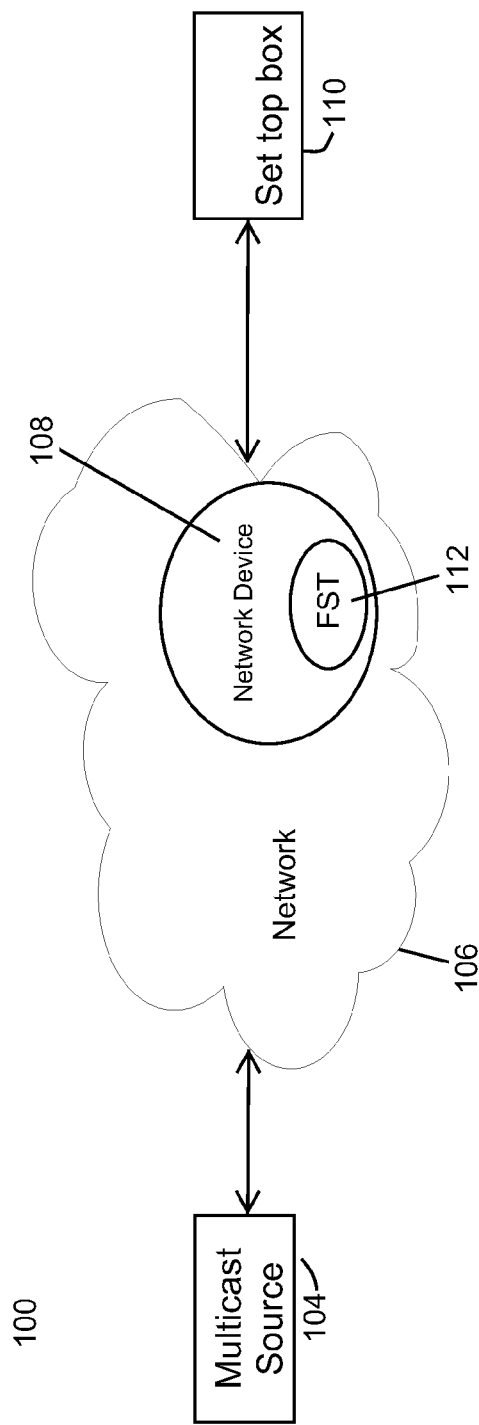
FIG. 1 illustrates an Internet Protocol (IP) television channel change system, in accordance with an embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving,"

"sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention pertain to methods and systems for reducing delays in video signal changes. Channel change startup delays associated with multicast digital video streams are reduced by utilizing a speed-up Group of Pictures. In one exemplary embodiment, a speed-up Group of Pictures of minimum length is injected and placed in front of an intra-frame of a normal Group of Pictures to facilitate rapid synchronization of the normal Group of Pictures. The present exemplary embodiment includes receiving a channel change request, such as an Internet Group Management Protocol (IGMP) join request, from a user and determining a packet transmission order for packets of a multicast digital video transport stream. The packet transmission order includes a normal Group of Pictures having a first intra-frame. It is appreciated that the Group of Pictures may be preceded by various information such as Program Clock References, Program Specific Information, Program Association Table (PAT), Program Map Table (PMT), Sequence Header, and Group of Picture Header.

In one embodiment, the method includes inserting a speed-up Group of Pictures (e.g., a single picture Group of Pictures) and video stream specific information, in front of the first intra-frame of the normal Group of Pictures to facilitate rapid rendering of the normal Group of Pictures. The video stream specific information may, in one example, include a recalculated PCR. In the present embodiment, the insertion of the speed-up Group of Pictures is implemented by a Fast Start Transmitter (FST). However, the present invention is not necessarily limited to a FST, and Speed-up GOP insertion can be implemented by other devices (e.g., a router, a switch, and/or a network device).

In addition, the exemplary implementation includes processing the packets in the determined packet transmission order. In the present embodiment, the packets are transmitted in the following order: Recalculated Program Clock Reference (PCR), Program Association Table (PAT), Program Map Table (PMT), Sequence Header, Group of Pictures Header, Intra-frame of the speed-up Group of Pictures, Intra-frame of the normal Group of Pictures. Thus, by inserting a speed-up Group of Pictures and video stream specific information, the present invention allows start-up delay to be significantly reduced.

FIG. 1 illustrates an Internet Protocol (IP) television channel change system 100, in accordance with an embodiment of the present invention. Internet Protocol (IP) television Channel change system 100 includes a multicast source 104, a network 106, a router 108, a Fast Start Transmitter (FST) 112, and an set-top box 110 (e.g., Internet Protocol set-top box). Within channel change system 100, multicast source 104, network 106, router 108, and set-top box 110 are communicatively coupled.

A set-top box (STB) is an electronic device that is connected to a communication channel, such as a phone, Integrated Services Digital Network (ISDN), Digital Subscriber Line (DSL), or cable television line, and produces output on a display, e.g., conventional television screen. Set-top boxes are commonly used to receive and decode digital television broadcasts. Set-top boxes fall into several categories, from the relatively simple implementations that receive and unscramble incoming television signals to more complex implementations that can also function as multimedia desktop computers. The multimedia desktop computers can run a variety of advanced services such as videoconferencing, home networking, IP telephony, video-on-demand (VoD) and high-speed Internet TV services. In one embodiment, a set-top box (STB) is an Internet Protocol (IP) set-top box (STB) which receives data in the form of Internet Protocol (IP) packets.

Although channel change system 100 is shown and described as having certain numbers and types of elements, the present invention is not necessarily limited to the exemplary implementation. That is, channel change system 100 can include elements other than those shown, and can include more than one of the elements that are shown. For example, channel change system 100 can include a greater or fewer number of sources than the one source (multicast source 104) shown.

Further, the network 106 of channel change system 100 can be implemented in a wide variety of ways. For example, network 106 can include various local area networks (LAN), metropolitan area networks (MAN), wide area networks (WAN), and/or the Internet. It is appreciated that components of channel change system 100 can be communicatively coupled via wired and/or wireless communication technologies. It is also appreciated the present invention is not necessarily limited to the configuration of channel change system 100.

In the present embodiment, video programs are forwarded by multicast source 104, which encodes the media content and sends packets of a multimedia stream through network 106. The multimedia stream can be compatible with a variety of compression protocols, for example, Motion Picture Experts Group 2 (MPEG-2) format, Motion Picture Experts Group 4 (MPEG-4) format, and/or any other current or future video compression standards. Upon receipt of the multimedia stream packets, multicast source 104 sends multimedia stream packets to router 108 in network 106, (e.g., an IP network). The MPEG-2 or MPEG-4 packets can be encapsulated within Real-Time Transport Protocol (RTP) and/or User Datagram Protocol (UDP) packets.

Also, although in the present embodiment only router 108 is shown, the present invention can be implemented to include other multicast-capable routers, switches, and IP network devices as part of the multicast distribution tree. In one embodiment, router 108 includes a Fast Start Transmitter 112 (FST).

Upon receipt of the multimedia stream packets, in one example, router 108 forwards multimedia stream packets to set-top box 110 that joins the multicast stream. Additionally, in other embodiments, it is appreciated that router 108 can send multimedia stream packets to other end stations that are part of the multicast group. An end station can join a multicast group by sending an Internet Group Management Protocol (IGMP) join request to router 108.

In one implementation, a user can send a channel change request from a remote control to set-top box 110. Set-top box 110 receives the channel change request and forwards to router 108. Upon receipt of the channel change request, router 108 determines the packet processing sequence for the multimedia stream packets of the new channel. The packet processing sequence includes a normal Group of Pictures, and the normal Group of Pictures includes a first intra-frame.

In one embodiment, Fast Start Transmitter 112 (FST) of router 108 generates an accelerating or speed-up Group of Pictures, e.g., a Group of Pictures comprising a single Intra-frame. In one embodiment, the FST inserts the accelerating Group of Pictures in front of the first normal GOP intra-frame to facilitate rapid picture rendering of the normal Group of Pictures.

In one embodiment, the Fast Start Transmitter (FST) includes one or more Startup Transmit Buffers (STX_BUFs) that function to buffer past packets from one or more multicast streams. Startup transmit buffering of multicast media streams can be implemented as a configured option on network device such as a router or switch. The startup transmit buffers can either be fixed in size, or be of a dynamic size, based on application specific-requirements, and can contain a continuous stream or "sliding window" of prior received multicast information. Alternatively, the startup transmit buffers can contain information deemed important in a piecemeal fashion from received multicast packets according to application specific requirements.

In addition, the U.S. patent application Ser. No. 10/969, 113, filed Oct. 20, 2004, entitled "SYSTEM AND METHOD FOR FAST START-UP OF LIVE MULTICAST STREAMS TRANSMITTED OVER A PACKET NETWORK," by Ramanathan T. Jagadeesan, Kristen Marie Robins, Bich Tu Nguyen, and Fang Wu, assigned to the same assignee of the present Patent Application, is hereby incorporated by reference, which further describes functions that can be performed by a Fast Start Transmitter (FST) and a Startup Transmit Buffers (STX_BUFs)

Specifically, when a user joins the multicast media stream, the FST operates to insert a speed-up GOP and transmit (e.g., in a burst mode) the transport packets stored in the STX_BUF to the set-top box (STB). In one embodiment, the FST inserts a speed-up GOP in a head of a normal GOP in the STX_BUF. The set-top box uses the speed-up GOP and normal GOP burst packets to generate a sufficient buffer of information that can be used to quickly start the rendering of media content.

Thus, the FST, by generating and inserting an accelerating or rapid synchronization GOP in front of the first Intra-frame, facilitates rapid picture rendering of the normal GOP and start-up delay associated with Group of Pictures length is significantly reduced.

Figure 2:
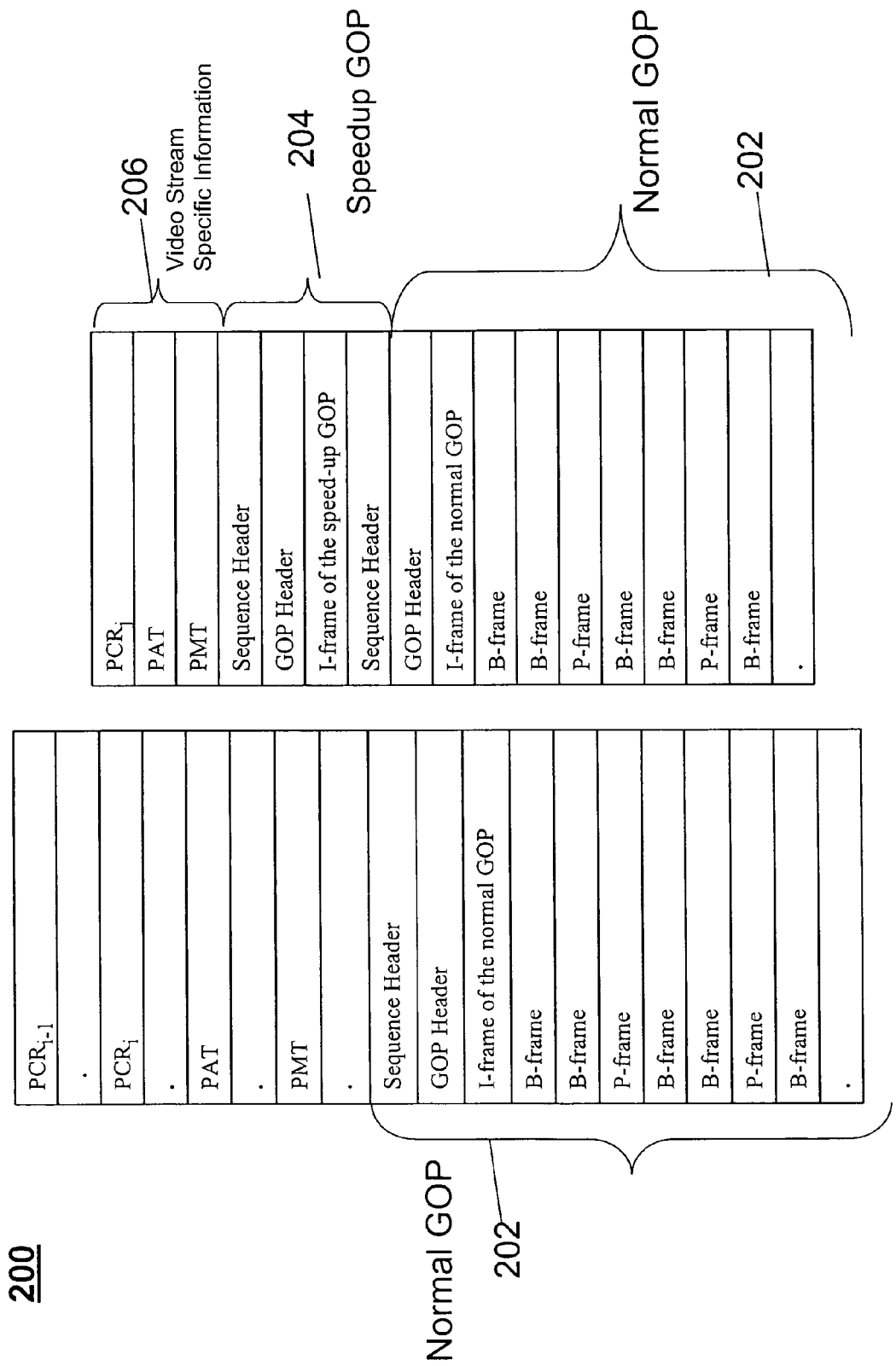
FIGS. 2A and 2B illustrate embodiments of the present invention in operation.

FIGS. 2A and 2B, illustrate embodiments of the present invention in operation. FIG. 2A illustrates a normal GOP with multimedia stream packets. However, startup delay associated with GOP length is not yet addressed.

FIG. 2B illustrates the insertion of a speed-up GOP 204 and video stream specific information 206 in front of the normal GOP 202. In one embodiment, the speed-up GOP 204 is inserted in the head of a normal GOP in the STX_BUF. Insertion of the speed-up GOP 204 allows rapid synchronization of normal GOP 202 and reduces start-up delay associated with GOP length. For example, delays otherwise associated with extraneous intermediate frames (e.g., P-frame and/or B-frames) can be reduced. By inserting the speed-up GOP 204 including only one Intra-frame and video stream specific information 206 (e.g., a recalculated PCR, PAT, and PMT), start-up latency associated with GOP length can be significantly reduced.

Figure 3:
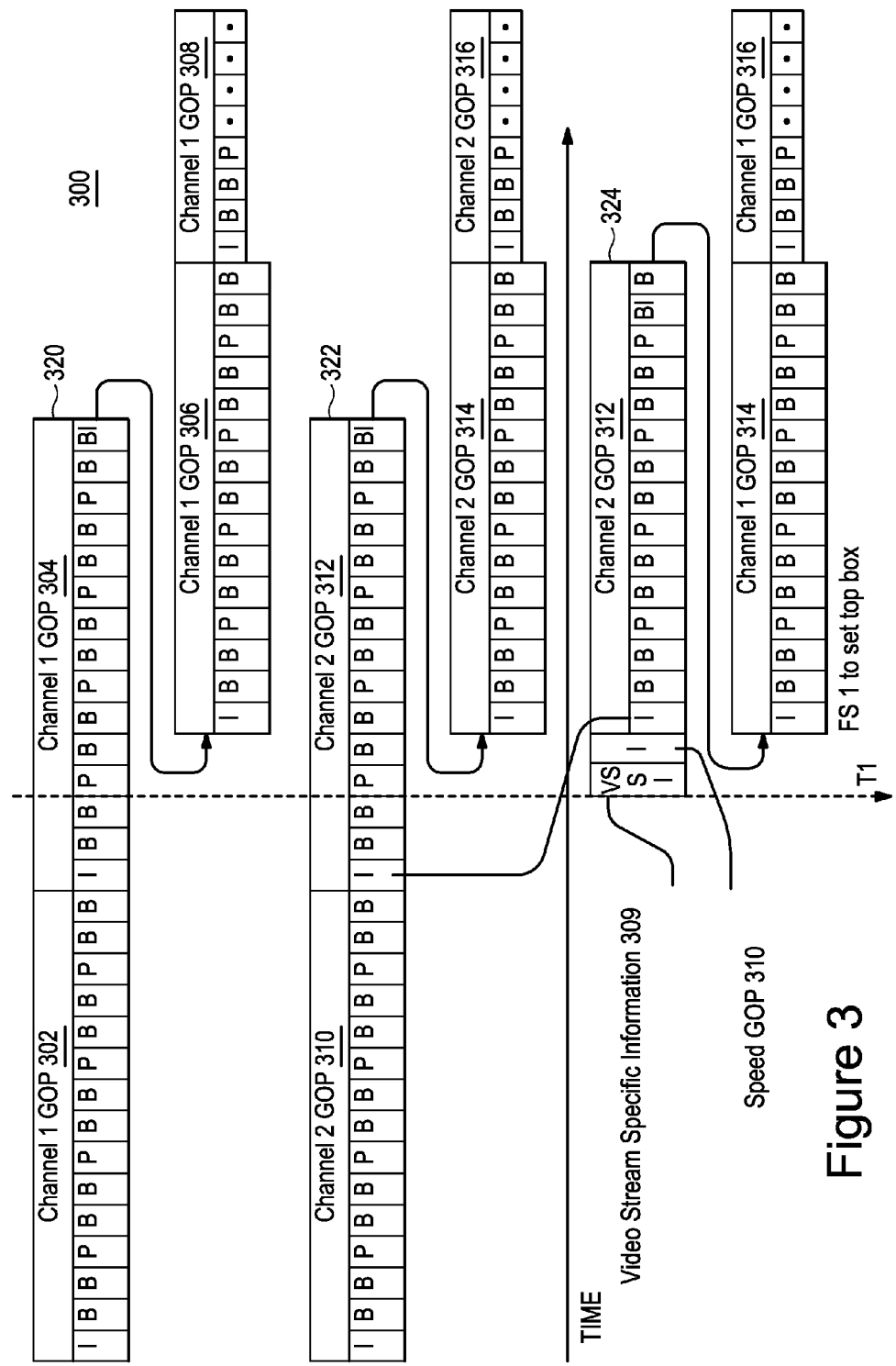
FIG. 3 illustrates block diagrams of an exemplary speed-up GOP insertion, in accordance with an embodiment of the present invention.

FIG. 3 illustrates block diagrams of an exemplary speed-up GOP insertion, in accordance with an embodiment of the present invention. A first multicast digital video transport stream 320 corresponds to a first content channel 1, a second multicast digital video stream 322 corresponds to a second content channel 2, and a third multicast digital video stream 324 corresponds to a Fast Start Transmitter (FST) frame sequence. Multicast digital video transport stream 320 includes Channel 1 GOP 302, Channel 1 GOP 304, Channel 1 GOP 306, and Channel 1 GOP 308. Multicast digital video transport stream 322 includes Channel 2 GOP 310, Channel 2 GOP 312, Channel 2 GOP 314, and Channel 2 GOP 316. Multicast digital video transport stream 324 includes Channel 2 video stream specific information 309, Speed-up GOP 310, Channel 2 GOP 312, Channel 2 GOP 314.

A user, such as an Internet Protocol Television (IPTV) viewer watching IPTV from channel 1, can initiate a channel change at time T1. Time T1 corresponds to the point between the second B-frame and first P-frame of channel 1 GOP 304. Similarly, Time T1 corresponds to the point between the first P-frame and third B-frame of channel 2 GOP 312.

Traditionally, a channel change request at Time T1 from multicast digital video transport stream 320 (channel 1) to multicast digital video stream 322 (channel 2) includes sending the remaining number of P-frames from channel 2 GOP 312 before sending the I-frame from channel 2 GOP 314. Because a GOP usually includes one I-frame and 14 Bidirectional interpolated and Predictive frames, the remaining number of B-frames and P-frames from channel 2 GOP 312, in this example, is 11 frames, which can cause a significant channel change time delay.

In contrast to traditional approaches, the present invention facilitates rapid synchronization of normal GOP channel changes by inserting a Speed-up GOP in front of the normal GOP. Specifically, in the present embodiment, in response to a channel change request, a network device (e.g., a Fast Start Transmitter) inserts video stream specific information 309 and Speed-up GOP 310 in front of Channel 2 GOP 312 to facilitate rapid synchronization of Channel 2 324 at an IP Set-top Box.

The present invention facilitates a more rapid synchronization with channel 2 324 because instead of synchronizing with channel 2 GOP 314 by processing 11 remaining B-frames and P-frames of GOP 312, the present invention allows synchronization with channel 2 GOP 312 by processing the video stream specific information 309 and speed-up GOP 310 (e.g., a single I-frame) alone. Consequently, the synchronization time can be reduced appreciably.

It is appreciated that speed-up GOP insertion can be implemented in a variety of configurations. For example, buffer capabilities of a STX_BUF buffer can be utilized to insert speed-up GOP in front of GOP 312.

Figure 4:
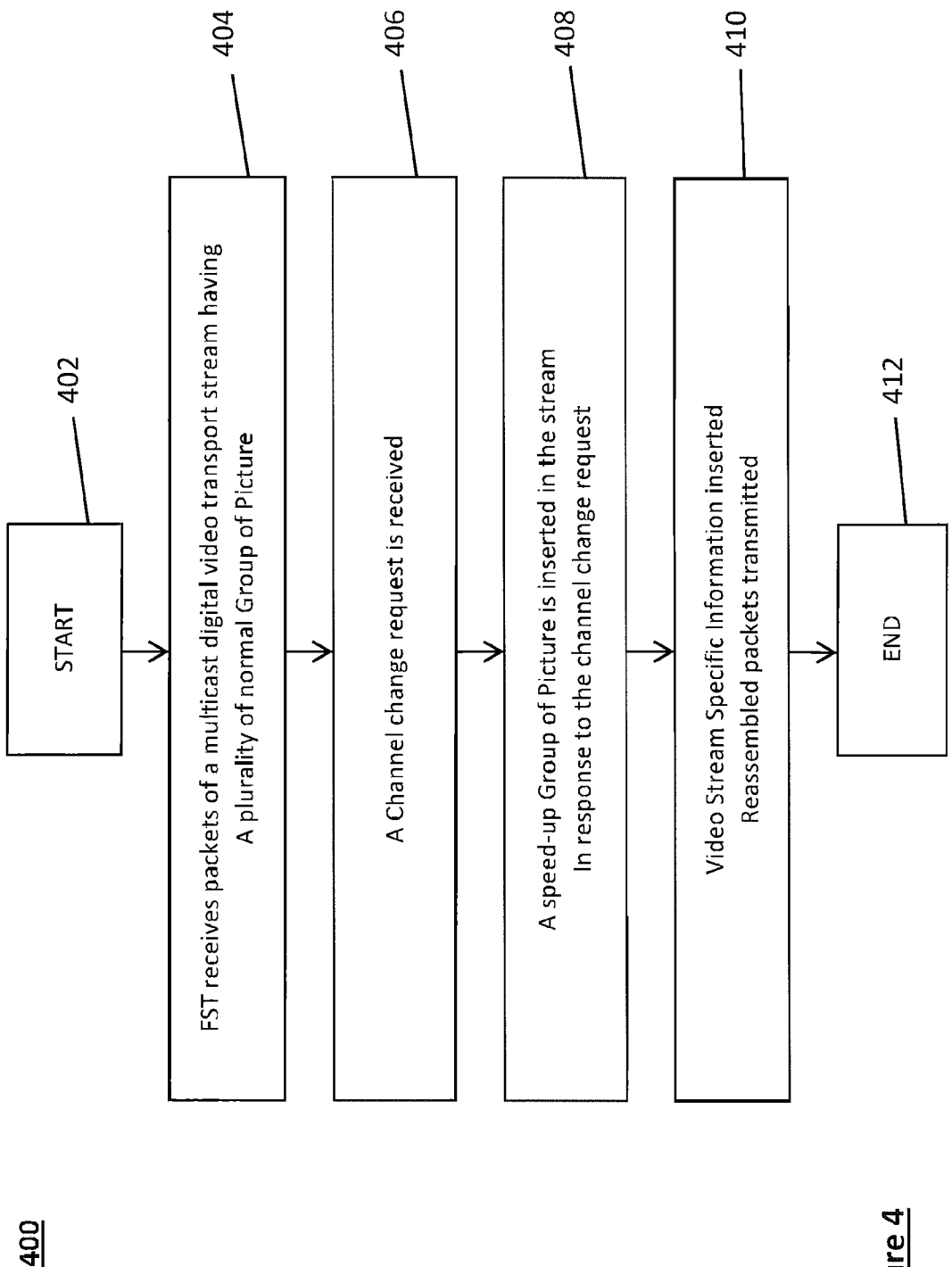
FIG. 4 illustrates a flowchart of a channel change method upon which embodiments in accordance with the present invention can be implemented.

FIG. 4 illustrates a flowchart 400 of a channel change method upon which embodiments in accordance with the present invention can be implemented. Although specific steps are disclosed in flowchart 400, such steps are exemplary. That is, embodiments of the present invention are well suited to performing various other or additional steps or variations of the steps recited in flowchart 400. It is appreciated that the steps in flowchart 400 can be performed in an order different than presented.

At block 404, packets of a multicast digital video transport stream having a plurality of normal Group of Pictures are received. In one example, the packets are received from a multicast source by a FST (fast start transmitter). It is appreciated that the multimedia digital video transport stream can be in Motion Picture Experts Group 2 (MPEG-2) format or in Motion Picture Experts Group 4 (MPEG-4) format.

At block 406, a channel change request is received. In one embodiment, the channel change request is an Internet Group Management Protocol (IGMP) join request. In other embodiments, the channel change request can be other applicable join requests.

At block 408, a speed-up Group of Pictures (GOP) is inserted in the stream (e.g., in front of the first I-frame) in response to the channel change request. Also, video stream specific information, such as PMT, PAT, and a modified PCR, may be inserted in the stream. The speed-up GOP can be inserted in front of the first Intra-frame by different devices. In one instance, the speed-up GOP can be created and inserted by a Fast Start Transmitter (FST). In another instance, the speed-up GOP can be created and inserted by other network devices. A speed-up GOP can be implemented in different ways. In one example, a speed-up GOP includes a single blank Intra-frame. In another example, a speed-up GOP includes a single Intra-frame that is identical to a subsequent Intra-frame.

At block 410, the packets are processed. In one example, processing includes reassembling and transmitting packets. In one embodiment, after the speed-up GOP is inserted, the transmission order is as follows: Recalculated Program Clock Reference PCR, Program Association Table (PAT), Program Map Table (PMT), Sequence Header, Group of Pictures Header, Intra-frame of the speed-up Group of Pictures, Intra-frame of the normal Group of Pictures. Thus, injecting a speed-up GOP, the IP set-top box can synchronize the new video stream faster and start-up delay associated with GOP length is appreciably reduced.

Figure 5:
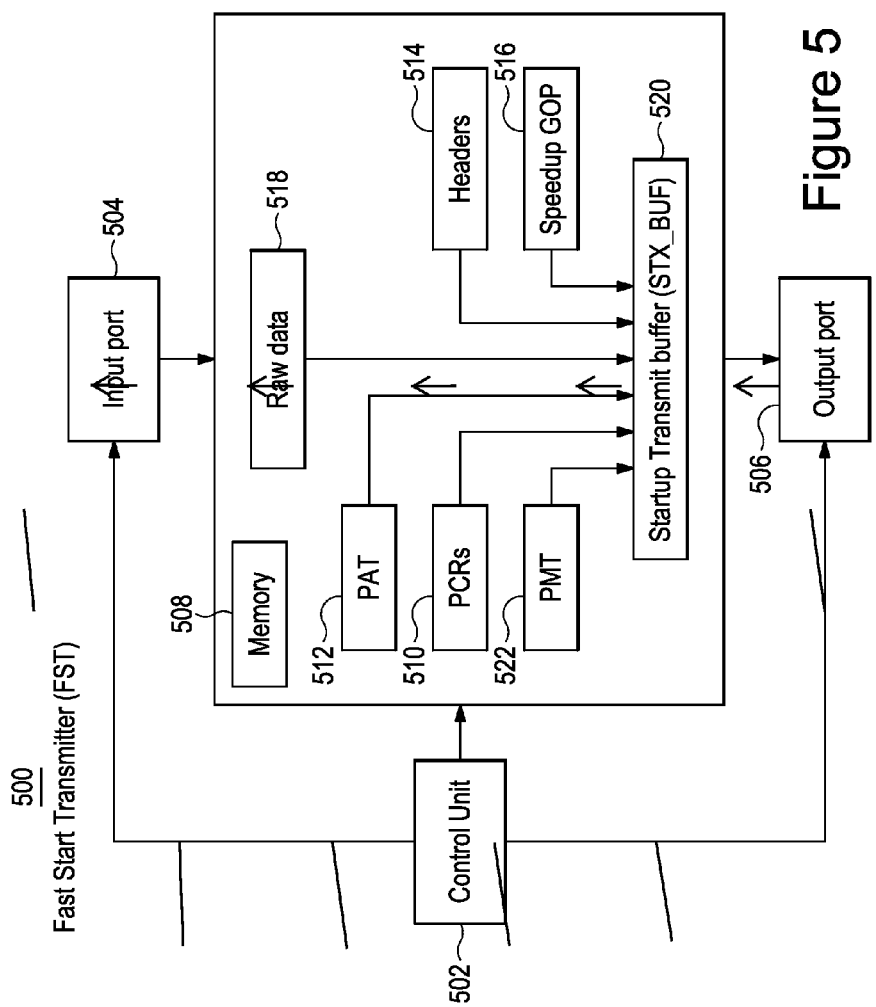
FIG. 5 illustrate block diagrams of a Fast Start Transmitter, upon which embodiments of the present invention can be implemented.

FIG. 5 is a block diagram that illustrates a Fast Start Transmitter (FST) 500 upon which embodiments of the present invention can be implemented. System 500 includes a control unit 502, an input port 504 for receiving data, an output port 506 for sending data, a memory 508, and a startup transmit buffer (STX_BUF) 520. Also, system 400 includes PCRs 510, PAT 512, PMT 522, MPEG Headers 514, Speed-up GOP 516, and Raw Data 518. Although Fast Start Transmitter (FST) 500 is shown and described as having certain numbers and types of elements, the present invention is not necessarily limited the exemplary implementation. That is, FST 500 can include elements other than those shown, and can include more than one of the elements that are shown.

In FST 500, in one embodiment, control unit 502 controls input port 504 for receiving data into memory 508. Also, control unit 502, in one example, controls storage of incoming data into Raw Data buffer 518. Further, control unit 502 can create PCRs 510, PAT 512, PMT 522, Headers 514, and Speed-up GOP 516 for outgoing data. In one implementation, control unit 502 can store data, such as PCR 510, PAT 512, and PMT 522 in Output Buffer 520. Moreover, in one embodiment, control unit 502 controls Output Port 506 for data transmission. The control unit 502 can be implemented in a variety of ways. For example, control unit 502 may be a CPU, an ASIC, a FPGA and/or a discrete hardware/firmware.

Input Port 504 receives packets of a multicast digital video transport stream including a plurality of normal Group of Pictures. The multimedia digital video transport stream can be in Motion Picture Exports Group 2 (MPEG-2) format or in Motion Picture Experts Group 4 (MPEG-4) format. In one embodiment, the multicast digital video transport streams are inputted into Input Port 504 and then into Memory 508 for further processing. The Raw Data buffer can be fixed in size or of a dynamic size, based on application specific requirements, and can include a continuous stream data. In one example, a buffer for PCRs 510, PAT 512, PMT 522, Headers 514, and/or Speed-up GOP 516 can include relevant information received directly from multicast packets.

In one exemplary implementation of a Speed-up GOP, the multicast streaming data packets are received and stored in Raw Data buffer 518. In one example, the data is staged in the buffer but not immediately transmitted. After receiving a channel change request, for example, an ICMP Report (Join) message, a process in Control Unit 502 is activated. This process, in one embodiment, creates a new GOP of minimum size and inserts it in Speed-up GOP buffer 516. Further, in one example, necessary changes are implemented on other piecemeal information (e.g., PCRS, PAT and PMT, stream Headers of various kinds) to meet requirements for an individual stream. Moreover, in one example, a suitable transmission order is determined for transferring the stream over a network, such as a LAN. In one example, the transmission order is PCRs, PAT, PMT, Headers, Speed-up GOP, normal GOP with leading I-frame, and other streaming data.

In one embodiment, FST 500 can be embedded within a network device. For example, FST can transmit data over Local Area Network (LAN) if embedded in a network router or switch. In another example, FST 500 can be embedded in a Digital Subscriber Line Access Multiplexer (DSLAM) and/or in a Cable Modem Termination System (CMTS).

To summarize, embodiments, by inserting a Speed-up GOP and video stream specific information in front of a normal stream, trigger client devices to start decoding much sooner, and significantly reduce channel change delay for live video streaming. Thus, embodiments improve a user's viewing experience to be more pleasant and positive.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A channel change method comprising:
receiving packets of a multicast digital video transport stream having a plurality of normal Group of Pictures, wherein the;
receiving a channel change request;
determining a packet transmission order for the packets of the multicast digital video transport stream;
inserting a speed-up Group of Pictures in said stream in response to said channel change request, according to the determined packet transmission order, wherein said speed-up Group of Pictures (GOP) is a single picture GOP and wherein said inserting the speed-up Group of Pictures is implemented by a fast start transmitter (FST);

inserting video stream specific information, wherein said video stream specific information includes a recalculated Program Clock Reference value and wherein the video stream specific information is inserted according to the determined packet transmission order; and transmitting said packets by the FST in burst mode.

2. The method of claim 1, wherein said speed-up Group of Pictures (GOP) is a Group of Pictures of minimum lengths and comprises a single Intra-frame.

3. The method of claim 1, wherein said multicast digital video transport stream is in Motion Picture Experts Group 2 (MPEG-2) format.

4. The method of claim 1, wherein said multicast digital video transport stream is in Motion Picture Experts Group 4 (MPEG-4) format.

5. A channel change system comprising:
a means for receiving packets of a multicast digital video transport stream having a plurality of normal Group of Pictures;
a means for receiving a channel change request;
a means for injecting video stream specific information and an accelerating Group of Pictures in said stream in response to said channel change request, wherein the video stream specific information includes a recalculated Program Clock Reference value and wherein said accelerating Group of Pictures (GOP) is a Group of Pictures comprising a single Intra-frame wherein content of said single Intra-frame is identical to a subsequent Intra-frame;
wherein the video stream specific information and an accelerating Group of Pictures are injected in a particular order; and
a means for processing said packets in the particular order.

6. A channel change system comprising:
a receiver configured to receive packets of a multicast digital video transport stream having a plurality of normal Group of Pictures and a channel change request to change to a new channel;
an injector configured to inject an accelerating Group of Pictures (GOP) and video stream specific information in said stream in response to said channel change request, wherein the video stream specific information includes a recalculated Program Clock Reference value and wherein the accelerating GOP and video stream specific information are injected in a particular order and wherein said accelerating GOP is a Group of Pictures comprising a single Intra-frame wherein content of said single Intra-frame is identical to a subsequent Intra-frame; and
a processor configured to process said packets in the particular order to synchronize with the new channel by processing only the accelerating GOP and video stream specific information.

7. The channel change system of claim 6, wherein said accelerating Group of Pictures is generated by a fast start transmitter.

8. The channel change system of claim 6, wherein said channel change request is an Internet Group Management Protocol (IGMP) report.

9. The channel change system of claim 6, wherein said accelerating Group of Pictures is of minimum length and comprises a single blank Intra-frame.

10. The channel change system of claim 6, wherein said multicast digital video transport stream is in Motion Picture Experts Group 2 (MPEG-2) format.

11. The channel change system of claim 6, wherein said multicast digital video transport stream is in Motion Picture Experts Group 4 (MPEG-4) format.

12. The channel change system of claim 6, wherein said injector comprises a fast start transmitter (FST).

13. The channel change system of claim 6, wherein said receiver is an input port of a router.

14. The channel change system of claim 6, wherein said processor is a central processing unit (CPU).

15. The channel change system of claim 6, wherein said system further comprises a plurality of memory buffers to serve as buffers for different channels of said multicast digital video transport stream.

* * * * *